(12) United States Patent
Östberg et al.

(10) Patent No.: US 10,524,274 B2
(45) Date of Patent: Dec. 31, 2019

(54) CONFIGURATION OF A RADIO EQUIPMENT OF AN ACCESS NODE

(71) Applicant: TELEFONAKTIEBOLAGET LM ERICSSON (PUBL), Stockholm (SE)

(72) Inventors: Christer Östberg, Staffanstorp (SE); Henrik Ronkainen, Södra Sandby (SE); Jan Roxbergh, Sollentuna (SE); Henrik Olson, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/523,778

(22) PCT Filed: Mar. 8, 2017

(86) PCT No.: PCT/SE2017/050216
§ 371 (c)(1),
(2) Date: May 2, 2017

(87) PCT Pub. No.: WO2018/080368
PCT Pub. Date: May 3, 2018

(65) Prior Publication Data
US 2018/0310331 A1 Oct. 25, 2018

(51) Int. Cl.
*H04W 72/12* (2009.01)
*H04W 88/08* (2009.01)
(Continued)

(52) U.S. Cl.
CPC .......... *H04W 72/12* (2013.01); *H04B 7/0617* (2013.01); *H04B 7/0639* (2013.01);
(Continued)

(58) Field of Classification Search
CPC ........... H04W 72/1289; H04W 72/042; H04W 72/046; H04W 72/1268; H04W 88/085
See application file for complete search history.

(56) References Cited

U.S. PATENT DOCUMENTS 8,644,368 B1    2/2014   Zhang et al.
8,923,386 B2   12/2014   Samardzija et al.
(Continued)

FOREIGN PATENT DOCUMENTS

EP    0843494 A2    5/1998
EP    1827035 A1    8/2007
(Continued)

OTHER PUBLICATIONS

Common Public Radio Interface (CPRI); Interface Specification; CPRI Specification V7.0, Oct. 9, 2015.
(Continued)

*Primary Examiner* — Eric Myers

(57) ABSTRACT

A method for configuring an RE of an access node, performed by an REC of the access node. The REC has an REC-RE interface to the RE. The method comprises determining scheduling and allocation of radio resources. The radio resources are to be used by the RE when communicating over a radio interface in a scheduled TTI. The method comprises configuring, in advance of the scheduled TTI, the RE to, in the scheduled TTI, operate according to the determined allocation of radio resources and communicate with the REC according to the determined scheduling. The method comprises communicating data with the RE in the scheduled TTI according to the determined scheduling.

20 Claims, 9 Drawing Sheets

(51) Int. Cl.
| | | |
|---|---|---|
| *H04B 7/06* | (2006.01) | |
| *H04W 16/28* | (2009.01) | |
| *H04W 72/04* | (2009.01) | |
| *H04L 5/00* | (2006.01) | |
| *H04W 28/00* | (2009.01) | |
| *H04W 28/12* | (2009.01) | |
| *H04L 27/26* | (2006.01) | |

(52) U.S. Cl.
CPC ............ *H04L 5/003* (2013.01); *H04L 5/0044* (2013.01); *H04L 5/0048* (2013.01); *H04L 5/0053* (2013.01); *H04L 5/0057* (2013.01); *H04L 27/2601* (2013.01); *H04W 16/28* (2013.01); *H04W 28/00* (2013.01); *H04W 28/12* (2013.01); *H04W 72/042* (2013.01); *H04W 72/046* (2013.01); *H04W 72/1268* (2013.01); *H04W 72/1289* (2013.01); *H04W 88/085* (2013.01); *H04L 27/26* (2013.01)

(56) References Cited

U.S. PATENT DOCUMENTS

| | | |
|---|---|---|
| 2007/0072646 A1 | 3/2007 | Kuwahara et al. |
| 2010/0074121 A1 | 3/2010 | Sakama |
| 2010/0075678 A1 | 3/2010 | Akman et al. |
| 2010/0136932 A1 | 6/2010 | Österling et al. |
| 2010/0273498 A1 | 10/2010 | Kim et al. |
| 2011/0032910 A1 | 2/2011 | Aarflot et al. |
| 2012/0057548 A1 | 3/2012 | Hasegawa |
| 2012/0300710 A1 | 11/2012 | Li et al. |
| 2013/0157660 A1 | 6/2013 | Awad et al. |
| 2013/0294419 A1 | 11/2013 | Heiser et al. |
| 2014/0119312 A1 | 5/2014 | Doetsch et al. |
| 2015/0029965 A1 | 1/2015 | Aminaka et al. |
| 2015/0030094 A1 | 1/2015 | Zhang |
| 2015/0303950 A1 | 10/2015 | Shattil |
| 2018/0317238 A1 | 11/2018 | Roxbergh et al. |

FOREIGN PATENT DOCUMENTS

| | | |
|---|---|---|
| EP | 2515590 A1 | 10/2012 |
| EP | 2515603 A2 | 10/2012 |
| EP | 2685755 A1 | 1/2014 |
| EP | 2739105 A1 | 6/2014 |
| EP | 2785099 A1 | 10/2014 |
| EP | 2911331 A1 | 8/2015 |
| TW | 201304448 A1 | 1/2013 |
| WO | 2014076004 A1 | 5/2014 |
| WO | 2015/197102 A1 | 12/2015 |
| WO | 2015/197104 A1 | 12/2015 |
| WO | 2016/039839 A1 | 3/2016 |
| WO | 2016195555 A1 | 12/2016 |
| WO | 2016195556 A1 | 12/2016 |
| WO | 2018093301 A1 | 5/2018 |

OTHER PUBLICATIONS

CPRI Specification V6.1 Common Public Radio Interface (CPRI); Interface Specification, Jul. 1, 2014.

Lorca et al., "Lossless Compression Technique for the Fronthaul of LTS/LTE-Advanced Cloud-RAN Architectures", 2013 IEEE 14th International Symposium on a World of Wireless, Mobile and Multimedia Networks(WOWMOM), IEEE, pp. 1-9, Jun. 4, 2013.

Park et al., "Large-scale Antenna Operation in Heterogeneous Cloud Radio Access Networks: A Partial Centralization Approach", IEEE Wireless Communications; vol. 22, No. 3, Jun. 1, 2015, pp. 1-9.

Sayeed et al., "Beamspace MIMO for High-Dimensional Multiuser Communication at Millimeter-Wave Frequencies", 2013 IEEE Global Communications Conference (Globecom), Dec. 9, 2013, pp. 3679-3684.

China Mobile Research Institute, "C-RAN: The road towards green RAN," China Mobile White Paper, v2, 2011.

Samardzija et al., "Compressed transport of baseband signals in radio access networks," IEEE Transactions on Wireless Communications, vol. 11, No. 9, pp. 3216-3225, 2012.

Park et al., "Robust and efficient distributed compression for cloud radio access networks," Vehicular Technology, IEEE Transactions on, vol. 62, No. 2, pp. 692-703, 2013.

Nieman et al., "Time-Domain Compression of Complex-Baseband LTE Signals for Cloud Radio Access Networks," GlobalSIP 2013.

Maiden, "Low-loss compression of CPRI baseband data," EDN Network paper, Sep. 17, 2014.

Zte et al., High level views on beam management for NR-MIMO, 3GPP TSG RAN WG 1 Meteing #88, R1-1701797, Athens, Greece, Feb. 13-17, 2017.

De La Oliva, et al. An Overview of the CPRI Specification and Its Application to C-RAN-Based LTE Scenarios, IEEE Communications Magazine, vol. 54, No. 2, pp. 152-159, Feb. 2016.

US 10,524,274 B2

CONFIGURATION OF A RADIO EQUIPMENT OF AN ACCESS NODE

This application is a 371 of International Application No. PCT/SE2017/050216, filed Mar. 8, 2017, and claims priority to International Application No. PCT/SE2016/051035 filed Oct. 25, 2016, the disclosures of which are fully incorporated herein by reference.

TECHNICAL FIELD

Embodiments presented herein relate to a method, a radio equipment controller, a computer program, and a computer program product for configuring a radio equipment of an access node. Embodiments presented herein further relate to a method, a radio equipment, a computer program, and a computer program product for receiving configuration of the radio equipment.

BACKGROUND

In communications systems, there may be a challenge to obtain good performance and capacity for a given communications protocol, its parameters and the physical environment in which the communications system is deployed.

For example, the introduction of digital beamforming antenna systems in access nodes, such as radio base stations, etc., could allow multiple simultaneous narrow beams to be used to provide network access to, and thus serve, multiple simultaneous terminal devices, such as user equipment (UE), etc. However, the current split in the access nodes between a radio equipment controller (REC) and a radio equipment (RE) as interconnected by the Common Public Radio Interface (CPRI) may no longer be feasible as passing the data for each individual radio chain over the CPRI interface could drive prohibitively high data rates.

In more detail, the bit rate of the current CPRI interface scales directly to the number of independent radio chains in the RE. When having e.g., a 200 MHz carrier bandwidth and 128 physical antenna elements in the beamforming antenna system, a bit rate of 530 Gbps would be needed for the CPRI interface with currently used sample rate and sample bit width. A further potential drawback with CPRI is the extra latency from uplink (UL; from terminal device to access node) sampling to the time the data can be used in downlink (DL; from access node to terminal device), as any information based on sampled data needs to be looped back from REC if to be used in RE.

One way to address the above-mentioned issues is to collapse the CPRI based architecture by removing the CPRI interface and putting the functionality of the REC in the RE. This approach has at least two drawbacks. Firstly, due to faster technological development of the REC compared to the RE, the technical lifetime of the REC is assumed to be shorter than that of the RE. Replacing the RE is more costly than replacing the REC. From this aspect it could thus be beneficial to keep the functionality of the RE as simple as possible. Secondly, the REC could be configured to make decisions spanning over multiple REs in order to make coordinated multi-sector decisions, e.g. when some REs represent coverage regions of the access node within the coverage regions of other REs (e.g. a so-called micro cell within a so-called macro cell). A collapsed architecture loses this overarching coordination possibility.

Hence, there is a need for an improved communication between the REC and the RE.

SUMMARY

An object of embodiments herein is to enable efficient communication between the REC and the RE.

According to a first aspect there is presented a method for configuring an RE of an access node. The method is performed by an REC of the access node. The REC has an REC-RE interface to the RE. The method comprises determining scheduling and allocation of radio resources. The radio resources are to be used by the RE when communicating over a radio interface in a scheduled transmission time interval (TTI). The method comprises configuring, in advance of the scheduled TTI, the RE to, in the scheduled TTI, operate according to the determined allocation of radio resources and communicate with the REC according to the determined scheduling. The method comprises communicating data with the RE in the scheduled TTI according to the determined scheduling.

According to a second aspect there is presented an REC of an access node for configuring an RE of the access node. The REC has an REC-RE interface to the RE and comprises processing circuitry. The processing circuitry is configured to cause the REC to determine scheduling and allocation of radio resources. The radio resources are to be used by the RE when communicating over a radio interface in a scheduled TTI. The processing circuitry is configured to cause the REC to configure, in advance of the scheduled TTI, the RE to, in the scheduled TTI, operate according to the determined allocation of radio resources and communicate with the REC according to the determined scheduling. The processing circuitry is configured to cause the REC to communicate data with the RE in the scheduled TTI according to the determined scheduling.

According to a third aspect there is presented an REC of an access node for configuring an RE of the access node. The REC has an REC-RE interface to the RE. The REC comprises processing circuitry and a storage medium. The storage medium stores instructions that, when executed by the processing circuitry, cause the REC to perform operations, or steps. The operations, or steps, cause the REC to determine scheduling and allocation of radio resources. The radio resources are to be used by the RE when communicating over a radio interface in a scheduled TTI. The operations, or steps, cause the REC to configure, in advance of the scheduled TTI, the RE to, in the scheduled TTI, operate according to the determined allocation of radio resources and communicate with the REC according to the determined scheduling. The operations, or steps, cause the REC to communicate data with the RE in the scheduled TTI according to the determined scheduling.

According to a fourth aspect there is presented an REC of an access node for configuring an RE of the access node. The REC has an REC-RE interface to the RE. The REC comprises a determine module configured to determine scheduling and allocation of radio resources. The radio resources are to be used by the RE when communicating over a radio interface in a scheduled TTI. The REC comprises a configure module configured to configure, in advance of the scheduled TTI, the RE to, in the scheduled TTI, operate according to the determined allocation of radio resources and communicate with the REC according to the determined scheduling. The REC comprises a communicate module configured to communicate data with the RE in the scheduled TTI according to the determined scheduling.

According to a fifth aspect there is presented a computer program for configuring an RE of an access node, the computer program comprises computer program code which, when run on processing circuitry of an REC, causes the REC to perform a method according to the first aspect.

According to a sixth aspect there is presented a method for receiving configuration of an RE of an access node. The method is performed by the RE. The RE has an REC-RE interface to an REC of the access node. The method comprises receiving configuration, in advance of a scheduled TTI and from the REC, to, when communicating over a radio interface in the scheduled TTI, operate according to an allocation of radio resources determined by the REC and communicate with the REC according to a scheduling determined by the REC. The method comprises preparing operation according to the determined allocation of radio resources. The method comprises communicating data with the REC in the scheduled TTI according to the determined scheduling.

According to a seventh aspect there is presented an RE of an access node for receiving configuration of the RE. The RE has an REC-RE interface to an REC of the access node and comprises processing circuitry. The processing circuitry is configured to cause the RE to receive configuration, in advance of a scheduled TTI and from the REC, to, when communicating over a radio interface in the scheduled TTI, operate according to an allocation of radio resources determined by the REC and communicate with the REC according to a scheduling determined by the REC. The processing circuitry is configured to cause the RE to prepare operation according to the determined allocation of radio resources. The processing circuitry is configured to cause the RE to communicate data with the REC in the scheduled TTI according to the determined scheduling.

According to an eighth aspect there is presented an RE of an access node for receiving configuration of the RE. The RE has an REC-RE interface to an REC of the access node. The RE comprises processing circuitry and a storage medium. The storage medium stores instructions that, when executed by the processing circuitry, cause the RE to perform operations, or steps. The operations, or steps, cause the RE to receive configuration, in advance of a scheduled TTI and from the REC, to, when communicating over a radio interface in the scheduled TTI, operate according to an allocation of radio resources determined by the REC and communicate with the REC according to a scheduling determined by the REC. The operations, or steps, cause the RE to prepare operation according to the determined allocation of radio resources. The operations, or steps, cause the RE to communicate data with the REC in the scheduled TTI according to the determined scheduling.

According to a ninth aspect there is presented an RE of an access node for receiving configuration of the RE. The RE has an REC-RE interface to an REC of the access node. The RE comprises a receive module configured to receive configuration, in advance of a scheduled TTI and from the REC, to, when communicating over a radio interface in the scheduled TTI, operate according to an allocation of radio resources determined by the REC and communicate with the REC according to a scheduling determined by the REC. The RE comprises a prepare module configured to prepare operation according to the determined allocation of radio resources. The RE comprises a communicate module configured to communicate data with the REC in the scheduled TTI according to the determined scheduling.

According to a tenth aspect there is presented a computer program for receiving configuration of an RE of an access node, the computer program comprising computer program code which, when run on processing circuitry of the RE, causes the RE to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these RECs, these REs, and these computer programs allows for efficient communication between the REC and the RE.

Advantageously these methods, these RECs, these REs, and these computer programs enable configuration of the RE where the transmission of the configuration data is separated from the actual data to be transmitted, thus enabling the REC to perform a flexible configuration of the RE.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
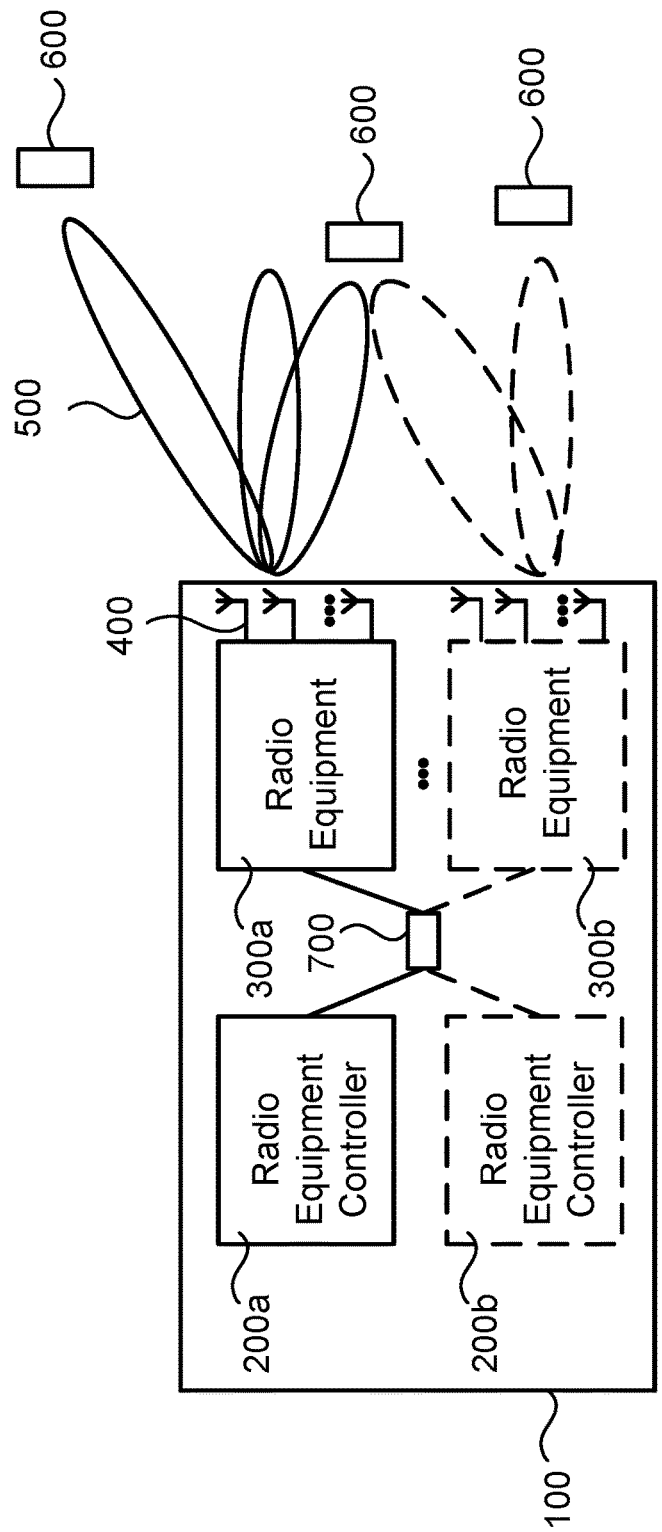
FIG. 1 is a schematic diagram illustrating an access node according to embodiments.

FIG. 1 is a schematic diagram illustrating an access node 100 where embodiments presented herein can be applied. The access node could be a radio base station such as a radio access network node, base transceiver station, node B, evolved node B, or access point. As disclosed above, the access node comprises at least one Radio Equipment Controller (REC) 200a, 200b and at least one Radio Equipment (RE) 300a, 300b. In the illustrative example of FIG. 1 the access node comprises two RECs and two REs, where each REC has an interface 700 to the REs; the interface 700 will hereinafter be denoted an REC-RE interface 700. Preferably, the REC-RE interface 700 is a wired interface, e.g. using optical fiber communications. However, alternatively the REC-RE interface 700 is a wireless interface, e.g. using radio communications. Further properties of the REC-RE interface 700 between the REC and the RE will be disclosed below. The REs are configured to perform DL transmissions to, and UL receptions from, terminal devices 600 in beams 500 by using appropriate beamforming weights at the antennas of the radio interface 400 at the RE. The beamforming weights define at least the pointing direction and the width of the beams.

The REC-RE interface 700 between REC 200a, 200b and RE 300a, 300b could be a packet-based interface, and hence not a streaming interface. This allows for quick and flexible allocation of resources on the REC-RE interface 700 to different terminal devices 600. In general terms, each terminal device 600 represents a user. The REC is configured to maintain knowledge about the terminal devices, and schedules the air interface between the access node and the terminal devices. The RE is configured to act on commands received from the REC.

As an illustrative example, consider a communications system having an air interface with a system bandwidth of 400 MHz and that provides support for 4 multiple input multiple output (MIMO) streams and utilizes access nodes with 64 antennas for beamforming. Using CPRI interfaces between the REC and the RE exposing all 64 antennas for the REC would require approximately 54 CPRI interfaces of 10 Gbps, since a CPRI interface carries about 480 MHz. Further, an interface using virtual antenna ports would require 4 MIMO streams of 400 MHz, and would require about 4 CPRI 30 interfaces of 10 Gbps, since one 10 Gbps CPRI interface still carries data for about 480 MHz. By also moving the modulation DL to the RE, the 4 MIMO streams of 400 MHz would require 7 Gbps (assuming 256 QAM and 20 Long Term Evolution (LTE) 20 MHz carriers), or one 10 Gbps CPRI interface. A higher bitrate of the CPRI interface is required in the UL if the whole system bandwidth is used, as demodulation is still performed in the REC.

A general aspect of the inventive concepts disclosed herein is to maximize the utilization of the REC-RE interface 700 between the REC 200a, 200b and the RE 300a, 300b, both in the case where there is only one REC 200a and when there are multiple RECs 200a, 200b sharing the REC-RE interface 700 (or segments of the REC-RE interface 700).

The embodiments disclosed herein thus relate to mechanisms for configuring an RE 300a, 300b of an access node 100 and receiving configuration of an RE 300a, 300b of an access node 100. In order to obtain such mechanisms there is provided an REC 200a, a method performed by the REC 200a, a computer program product comprising code, for example in the form of a computer program, that when run on processing circuitry of the REC 200a, causes the REC 200a to perform the method. In order to obtain such mechanisms there is further provided an RE 300a, 300b, a method performed by the RE 300a, 300b, and a computer program product comprising code, for example in the form of a computer program, that when run on processing circuitry of the RE 300a, 300b, causes the RE 300a, 300b to perform the method.

Figure 2:
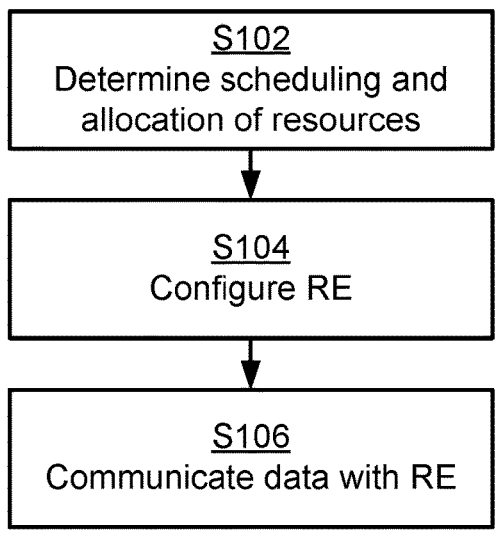
FIGS. 2, 3, 4, and 5 are flowcharts of methods according to embodiments.
Figure 4:
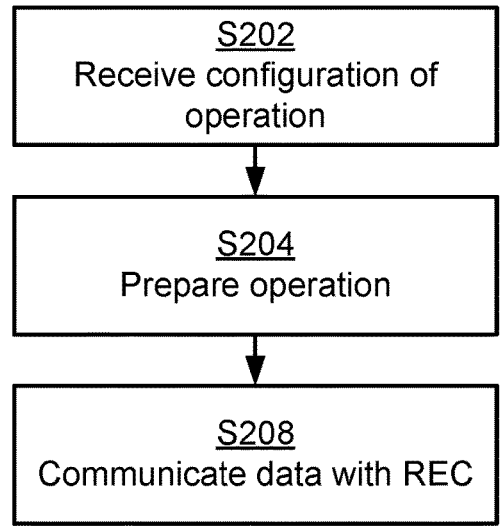
Figure 3:
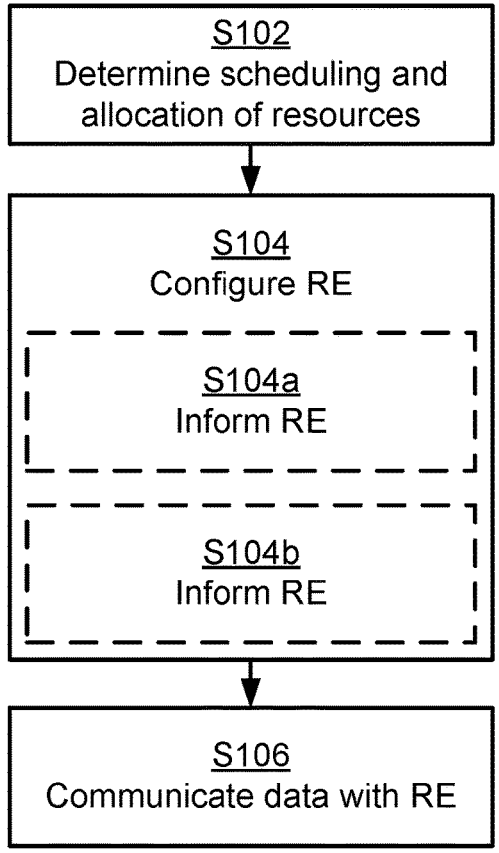
Figure 5A:
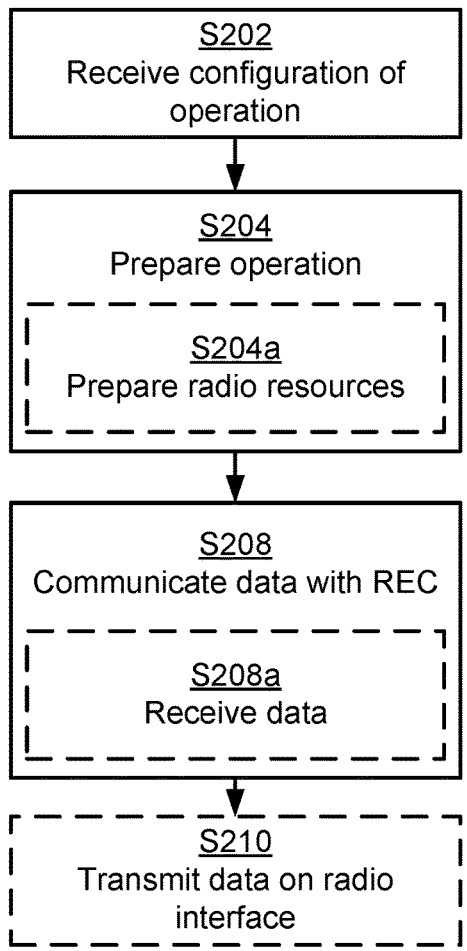
Figure 5B:
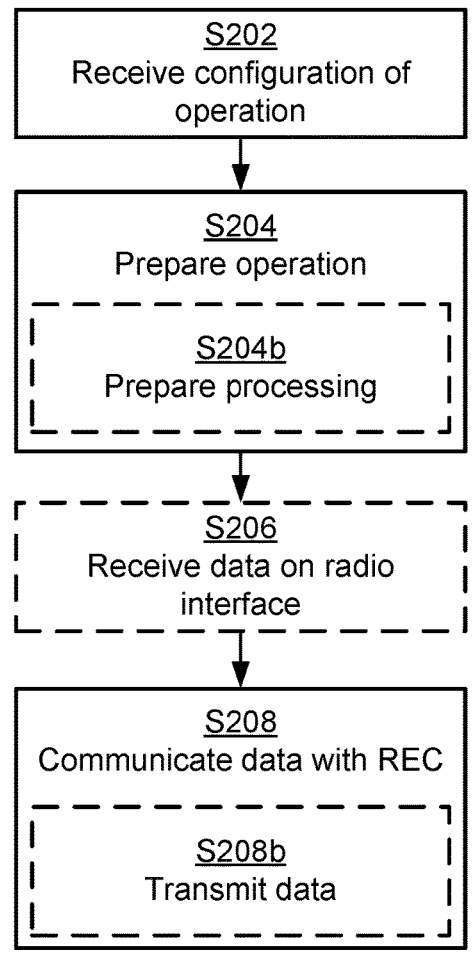

FIGS. 2 and 3 are flowcharts illustrating embodiments of methods for configuring an RE 300a, 300b of an access node 100 as performed by the REC 200a. FIGS. 4 and 5 are flowcharts illustrating embodiments of methods for receiving configuration of an RE 300a, 300b of an access node 100 as performed by the RE 300a, 300b. The methods are advantageously provided as computer programs 1620a, 1620b.

Reference is now made to FIG. 2 illustrating a method for configuring an RE 300a, 300b of an access node 100 as performed by the REC 200a according to an embodiment. The REC 200a has an REC-RE interface 700 to the RE 300a, 300b.

The REC 200a is to configure the RE 300a, 300b in terms of scheduling and allocation of radio resources. Particularly, the REC 200a is configured to perform step S102: S102: The REC 200a determines scheduling and allocation of radio resources. The radio resources are to be used by the RE 300a, 300b when communicating over the radio interface 400 in a scheduled transmission time interval (TTI).

Once the scheduling and allocation of radio resources have been determined the REC 200a configures the RE 300a, 300b accordingly. Particularly, the REC 200a is configured to perform step S104:

S104: The REC 200a configures, in advance of the scheduled TTI, the RE 300a, 300b to, in the scheduled TTI, operate according to the determined allocation of radio resources and communicate with the REC 200a according to the determined scheduling. Examples of configurations will be provided below.

Once the RE 300a, 300b has been scheduled the REC 200a communicates with the RE 300a, 300b accordingly. Particularly, the REC 200a is configured to perform step S106:

S106: The REC 200a communicates data with the RE 300a, 300b in the scheduled TTI according to the determined scheduling. Examples of how the REC 200a and the RE 300a, 300b could communicate will be provided below.

Performing steps S102, S104, S106 enables the REC 200 to separate the transmission configuration data from the actual data to be transmitted. The transmission of the data in step S106 can appear anytime between when the configuration is transmitted in step S104 and the TTI when it should be on the air (as transmitted by the radio interface 400) with an additional difference in time big enough to admit the signal processing of the data in the RE 300a, 300b before it is sent on the radio interface 400. For the uplink the configuration in step S104 is sent in advance of TTI when the data is received on the radio interface 400. The configuration in step S104 could be sent in time early enough to admit configuration of the RE 300a to receive the data from the radio interface 400 for the relevant TTI. The transmission of the data from the RE 300a to the REC 200a could then start as soon as it has been processed enough at the RE 300a to admit the data to be transferred.

Figure 6:
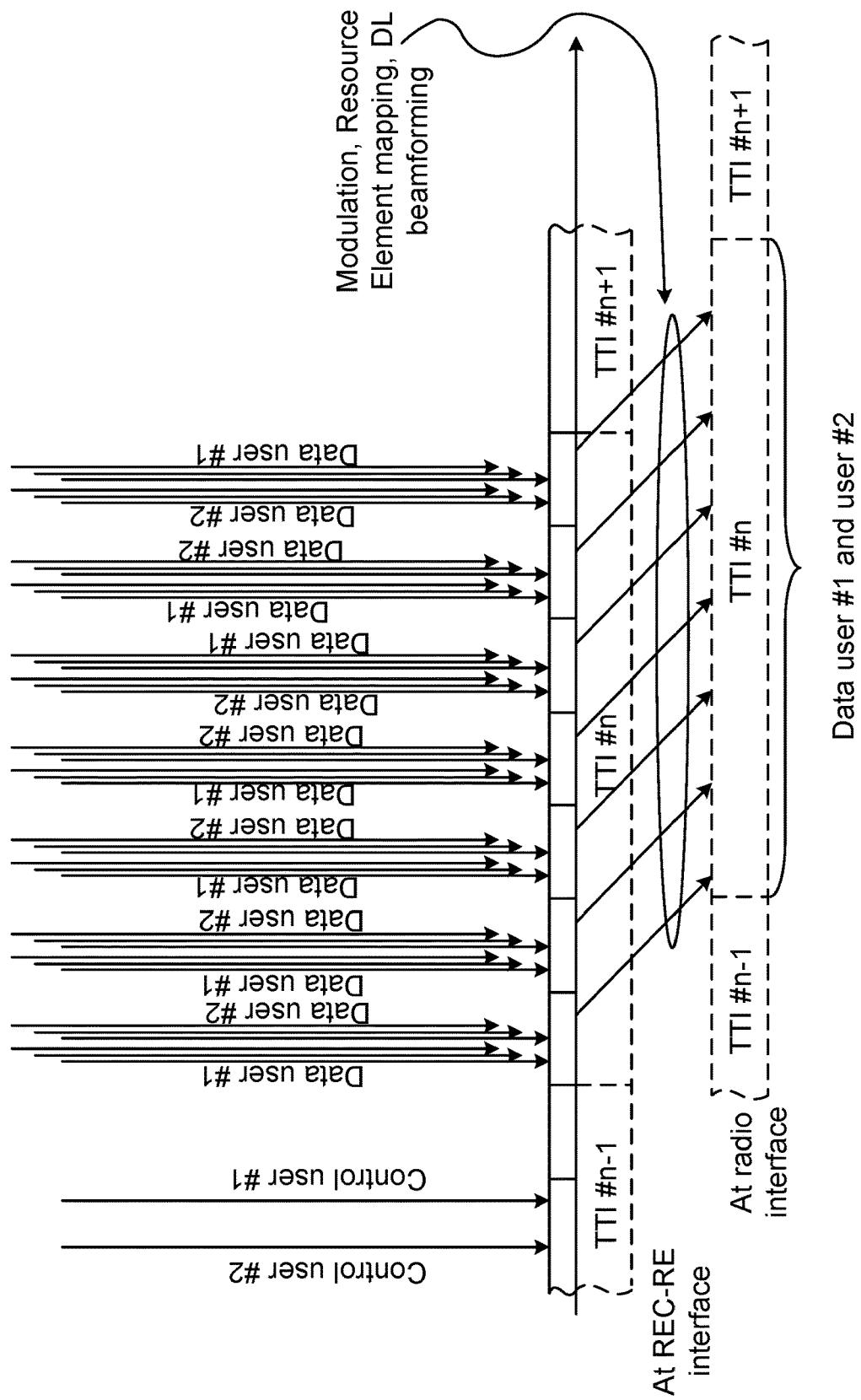
FIG. 6 is a schematic illustration of the timing principle for downlink data transport on the REC-RE interface according to embodiments.
Figure 7:
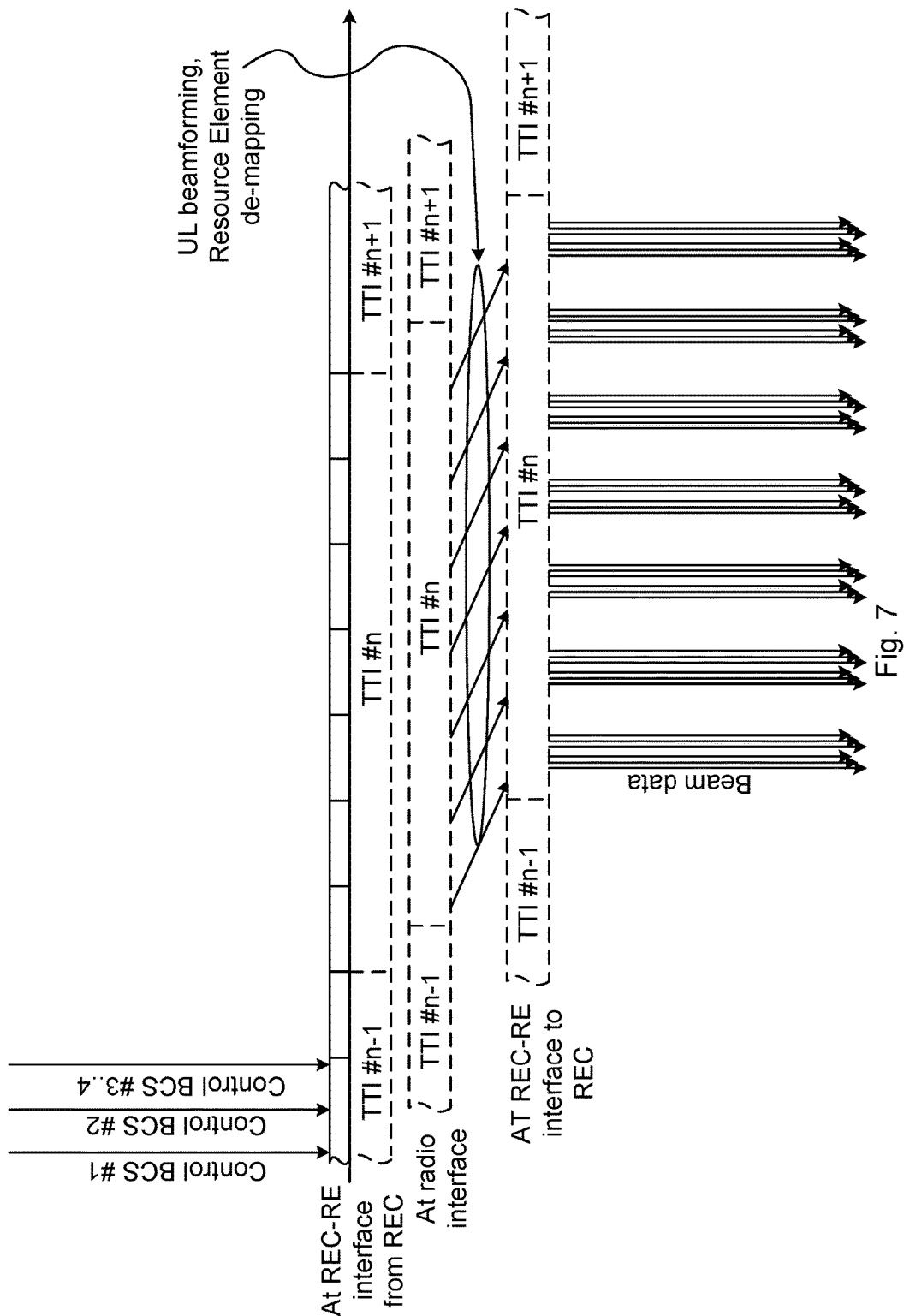
FIG. 7 is a schematic illustration of the timing principle for uplink data transport on the REC-RE interface according to embodiments.

In this respect, a given TTI for the REC-RE interface 700 does not necessary align in time with the same given TTI for the radio interface 400. This is illustrated in FIGS. 6 and 7 below.

Embodiments relating to further details of configuring an RE 300a, 300b of an access node 100 as performed by the REC 200a will now be disclosed.

The communication could either be downlink transmission or uplink reception. Hence, the data could be part of either downlink transmission or uplink reception.

Reference is now made to FIG. 3 illustrating methods for configuring an RE 300a, 300b of an access node 100 as performed by the REC 200a according to further embodiments. It is assumed that steps SS102, S104, S106 are performed as described above with reference to FIG. 2 and a thus repeated description thereof is therefore omitted.

In some aspects the configuring in step S104 involves the REC 200a to provide information to the RE 300a, 300b regarding in which TTI data is to be transmitted or received on the radio interface 400. Hence, according to an embodiment the REC 200a is configured to perform step S104a as part of the configuring in step S104:

S104a: The REC 200a informs the RE 300a, 300b about in which scheduled TTI to operate according to the determined allocation of radio resources.

In further aspects, the REC 200a could configure RE 300a to, in the uplink, multiplex measurements with data. Hence, according to an embodiment the REC 200a is configured to perform step S104b as part of the configuring in step S104:

S104b: The REC 200a informs the RE 300a, 300b to, when the data is part of uplink reception, multiplex uplink measurements of terminal devices 600 with uplink data of the terminal devices 600 when communicating the data with the REC 200a in the scheduled TTI.

Reference is now made to FIG. 4 illustrating a method for receiving configuration of an RE 300a, 300b of an access node 100 as performed by the RE 300a, 300b according to an embodiment. The RE 300a, 300b has an REC-RE interface 700 to the REC 200a of the access node 100.

As disclosed above, the REC 200a in step S104 configured the RE 300a, 300b. It is assumed that these instructions are received by the RE 300a. Hence, the RE 300a is configured to perform step S202:

S202: The RE 300a receives configuration, in advance of a scheduled TTI and from the REC 200a, to, when communicating over the radio interface 400 in the scheduled TTI, operate according to an allocation of radio resources determined by the REC 200a and communicate with the REC 200a according to the scheduling determined by the REC 200a.

The RE 300a, once having received the configuration, prepares its operation accordingly. Particularly, the RE 300a is configured to perform step S204:

S204: The RE 300a prepares operation according to the determined allocation of radio resources.

Then the RE 300 communicates data with the REC 200a. Particularly, the RE 300a is configured to perform step S208:

S208: The RE 300a communicates data with the REC 200a in the scheduled TTI according to the determined scheduling.

Embodiments relating to further details of receiving configuration of an RE 300a, 300b of an access node 100 as performed by the RE 300a, 300b will now be disclosed.

As disclosed above, the data could be part of either downlink transmission or uplink reception. Uplink data generally refers to data transferred from the RE 300a to the REC 200 on the REC-RE interface 700. Such uplink data could represent raw data as received on the radio interface 400 at the RE 300a and forwarded by the RE 300a to the REC 200a. Alternatively, such uplink data could represent refined data as determined by the RE 300a, where the refined data is based on raw data as received on the radio interface 400, and where the RE 300a processes the raw data in order to determine the refined data. That is, the refined data is determined from the raw data. One non-limiting example of raw data is in-phase and quadrature (IQ) constellation points. One example of refined data is channel estimate values.

Reference is now made to FIG. 5 illustrating methods for receiving configuration of an RE 300a, 300b of an access node 100 as performed by the RE 300a, 300b according to further embodiments. It is assumed that steps S202, S204, S208 are performed as described above with reference to FIG. 4 and a thus repeated description thereof is therefore omitted.

As disclosed above, in some aspects the configuration comprises information about in which scheduled TTI to operate according to the determined allocation of radio resources.

As further disclosed above, in some aspects the configuration comprises information informing the RE 300a, 300b to, when the data is part of uplink reception, multiplex uplink measurements of terminal devices 600 with uplink data of the terminal devices 600 when communicating the data with the REC 200a in the scheduled TTI.

Embodiments relating to aspects where the data to be communicated between the REC 200a and the RE 300a is part of downlink transmission will now be disclosed. Particular reference is made to FIG. 5(a).

The communication of data in step S208 thus pertains to downlink communication of the data from the REC 200a to the RE 300a.

In some aspects the RE 300a prepares the resources to be used for the processing of the data messages. Hence, the RE 300a could be configured to perform step S204a as part of the preparing in step S204 in an embodiment where the data is part of downlink transmission:

S204a: The RE 300a prepares, in advance of the scheduled TTI, the radio resources to be used for operating according to the determined allocation of radio resources.

The RE 300a could then, after having prepared the radio resources in step S204a, receive the data from the REC 200a. Hence, according to an embodiment the RE 300a is configured to perform step S208a as part of the communicating in step S208:

S208a: The RE 300a receives the data to be transmitted according to the prepared processing from the REC 200a, on the REC-RE interface 700, and in the scheduled TTI.

The RE 300a could then, after having received the data from the REC 200a in step S208a, forward the data to the radio interface 400. Hence, according to an embodiment the RE 300a is configured to perform step S210:

S210: The RE 300a transmits the data on the radio interface 400 in the scheduled TTI according to the prepared radio resources.

Embodiments relating to aspects where the data to be communicated between the REC 200a and the RE 300a is part of uplink reception will now be disclosed. Particular reference is made to FIG. 5(b).

The communication of data in step S208 thus pertains to uplink communication of the data to the REC 200a from the RE 300a.

In some aspects the RE 300a prepares the resources to be used for the processing of the data messages. Hence, the RE 300a could be configured to perform step S204b as part of the preparing in step S204 in an embodiment where the data is part of uplink reception:

S204b: The RE 300a prepares, in advance of the scheduled TTI, processing of the data for communicating the data to the REC 200a according to the determined scheduling.

The RE 300a could then receive the data on the radio interface 400. Hence, according to an embodiment the RE 300a is configured to perform step S206:

S206: The RE 300a receives the data on the radio interface 400 in the scheduled TTI.

The RE 300a could then, after having received the data on the radio interface 400 in step S206, forward the data to the REC 200a. Hence, according to an embodiment the RE 300a is configured to perform step S208b as part of the communicating in step S208:

S208b: The RE 300a transmits, on the REC-RE interface 700 to the REC 200a and in the scheduled TTI, the data received on the radio interface 400 after having been processed according to the prepared processing.

Further aspects and embodiments applicable to both the methods performed by the REC 200a and the RE 300a disclosed above will now be provided.

In some aspects the control information (metadata) valid for the radio transmission/reception in a future TTI is for downlink divided per each scheduled user since the configuration such as beam weights has to be adapted to the radio conditions experienced for each user, see FIG. 6. FIG. 6 schematically illustrates the general timing principle for downlink data transport on the REC-RE interface 700. Hence, according to an embodiment the RE 300a, 300b is configured to communicate with terminal devices 600 and the allocation of radio resources, when the data is part of downlink transmission, is determined per terminal device 600.

Similar aspects could be valid for the uplink but the addressed entity is a beam compose section (BCS; defining a set of physical resource blocks (PRBs)) in which several users are scheduled, see FIG. 7. FIG. 7 schematically illustrates the general timing principle for uplink data transport on the REC-RE interface 700. Hence, according to an embodiment the RE 300a, 300b is configured to communicate in beams 500, where the beams 500 form beam compose sections, and the allocation of radio resources, when the data is part of uplink reception, is determined per beam compose section.

In some aspects, common channel transmission/reception (e.g. broadcast information or random access) is treated as unique users, where the configuration ensures that the radio transmission/reception is performed in a beam shape that typically is wider than for the dedicated channels. Hence, according to an embodiment the RE 300a, 300b is configured to communicate common channel information and with the terminal devices 600. Separate allocation of radio resources could then be determined for communicating the common channel information and for communicating with the terminal devices 600.

In some aspects the control information for several terminal devices 600 is multiplexed and/or grouped into one common message. On the other hand, it may as well be so that the size of the control information for one terminal device 600 is too big to fit into one message (as limited by a maximum data packet size) and then the information is segmented and mapped to several messages. Further, to shorten the overall latency and reduce the memory needs for data buffering, data could be transmitted on symbol rate over the REC-RE interface 700. That is, for every symbol there is a new data message.

Hence, according to a first embodiment the configuring is provided by the REC 200a to the RE 300a, 300b as configuring information in messages, and at least one of the messages comprises configuring information of at least two beams 500 and/or terminal devices 600. According to a second embodiment the configuring is provided by the REC 200a to the RE 300a, 300b as configuring information, and the configuring information per beam 500 and/or terminal device 600 is spread between at least two messages. Thus, similar as for the control information, in downlink the data could be logically sent per terminal device 600, but data for several terminal devices 600 might be multiplexed and/or grouped into one common message, or data for one terminal device 600 may be segmented into several data messages for each symbol and terminal device 600. In uplink, data could be sent on symbol rate as well but contents in uplink data messages could be organized on beam directions or beams 500 (such as a linear combination of beam directions) valid for a certain frequency segment. That is, from a logical point of view, the uplink messages on the REC-RE interface 700 could comprise data for the selected beams 500 or beam directions for a number of sub-carriers during one symbol. All of this data is then common for all terminal devices 600 allocated to the particular frequency segment identified by the number of sub-carriers.

Figure 8:
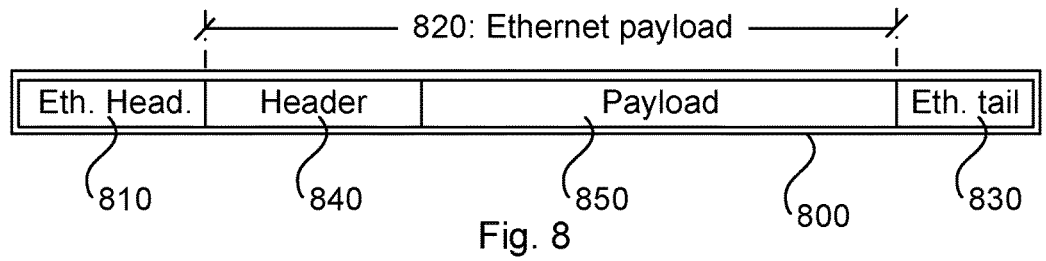
FIG. 8 is a schematic illustration of an Ethernet packet according to embodiments.

According to an embodiment the messages are transmitted as payload in Ethernet packets. The payload in each Ethernet packet comprises a header field defined by the REC-RE interface 700 and a payload field comprising the configuring information. FIG. 8 schematically illustrates an Ethernet packet 800. The Ethernet packet 800 has an Ethernet header field 810, an Ethernet payload field 820 and an Ethernet tail field 830. The Ethernet payload field 820 comprises an REC-RE interface header field 840 and an REC-RE interface payload field 850. The REC-RE interface payload field 850 comprises the actual data transferred on the REC-RE interface 700. The REC-RE interface header field 840, among other things, indicates the message identifier as well as the destination address which represented by a tuple of {MAC address, VLAN ID, CEP}, where MAC is short for medium access control, VLAN ID is short for virtual local area network identity, and CEP is short for connection end point. Hence, in a low load situation where there are just a few active terminal devices 600, only a limited set of the hardware resources may be active. Then the RE 300a, 300b may allocate the CEPs to the active hardware resources only.

Figure 9:
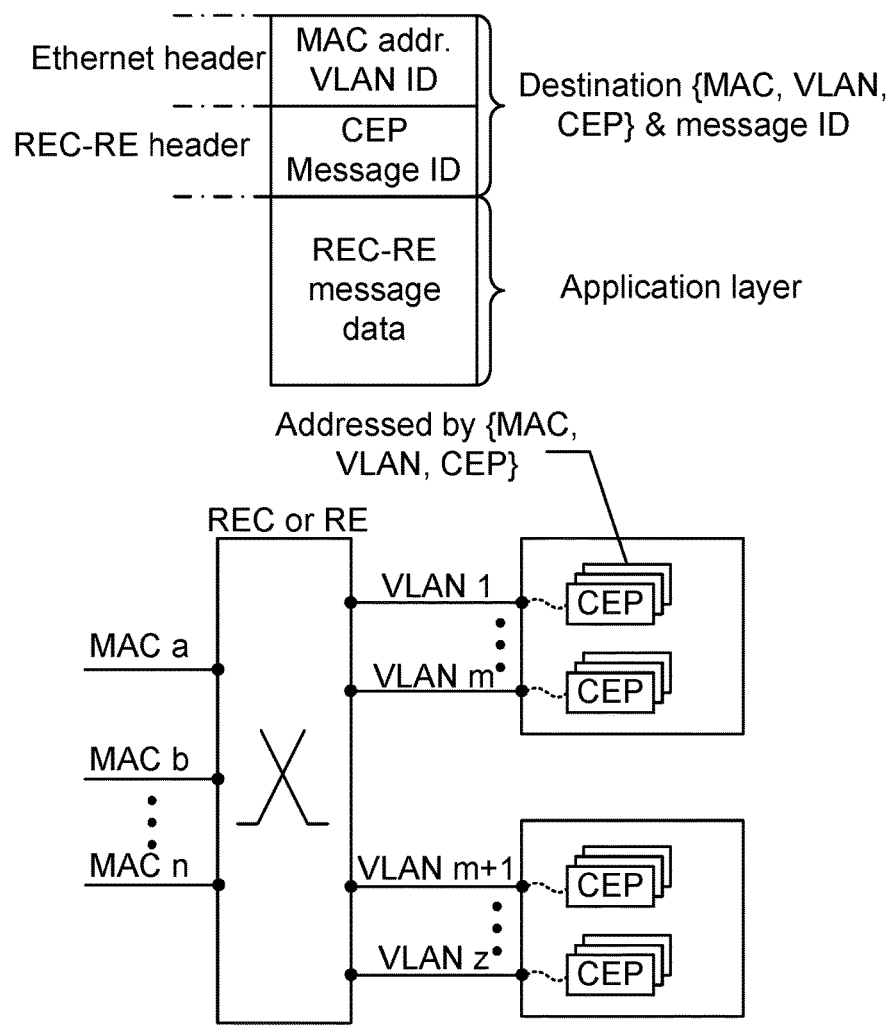
FIG. 9 is a schematic illustration of a layout for messages transported on the REC-RE interface according to embodiments.

To overcome the payload limitations at the link layer, yet another layer could be added on top to handle segmentation and de-segmentation of messages. Using segmentation and de-segmentation on top of the link layer would imply loss of complete messages even though only one packet is lost, but the communication on the REC-RE interface 700 would benefit from parts of the message. Due to this, the application level has to consider the max payload size and messages are defined accordingly. To enable flexible resource management in the REC 200a and RE 300a, 300b, where parts of the hardware resources can be powered down for energy efficiency purpose, the destination of messages transferred on the REC-RE interface 700 could be provided as a logical address which may be decided by the receiving end. This is illustrated in FIG. 9 which schematically illustrates a principle for a layout for messages transported on the REC-RE interface 700 and the addressing of such messages.

Figure 10:
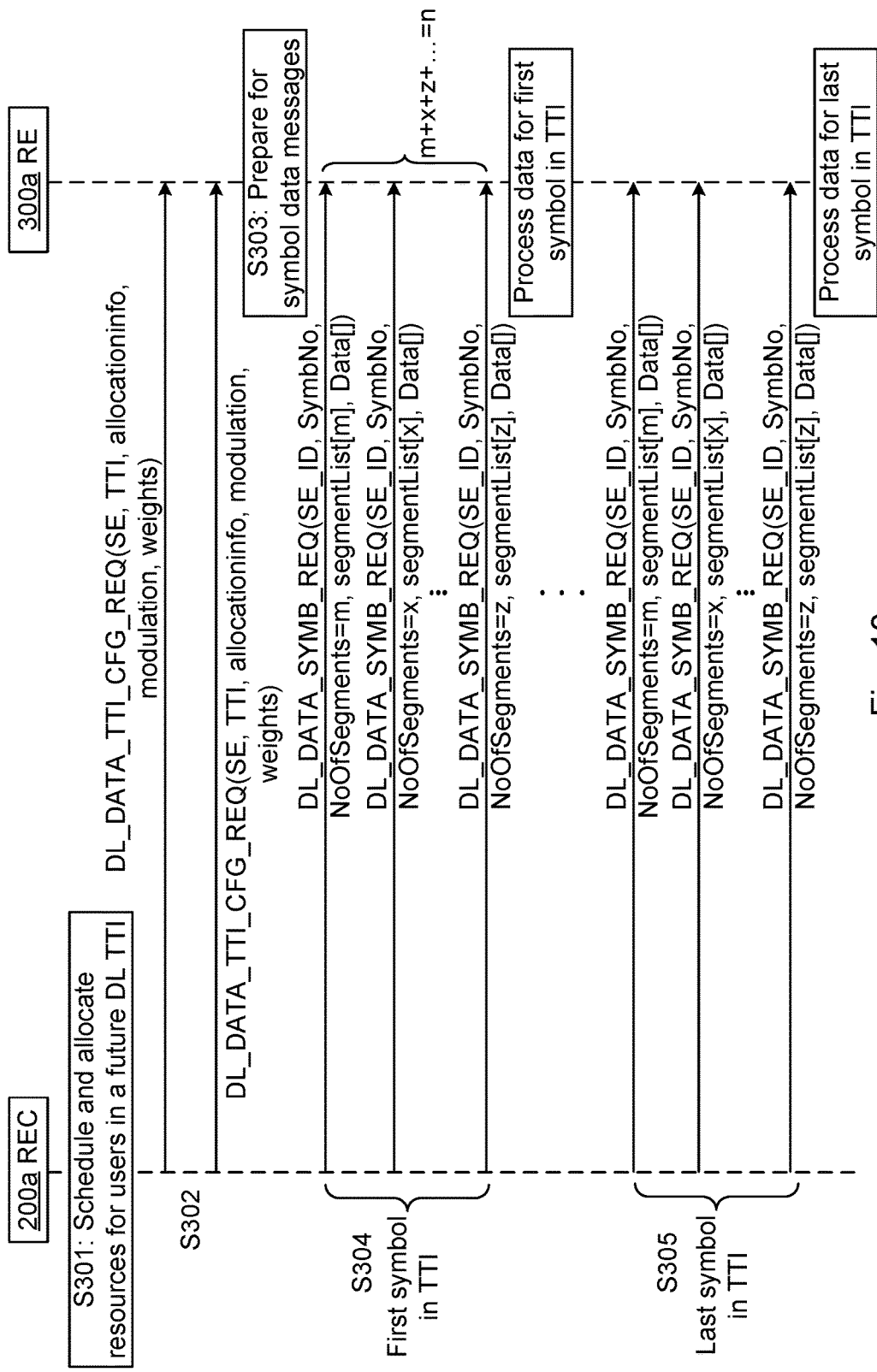
FIG. 10 is a signalling diagram for uplink data transfer over the REC-RE interface according to embodiments.

FIG. 10 is a signalling diagram for downlink data transfer over the REC-RE interface 700 for one TTI.

S301: The REC 200a determines scheduling and allocation of radio resources for downlink transmission, considering opportunities for multi-user MIMO with beamforming. That is, the REC 200a determines the radio resources to be used by the RE 300a, 300b when communicating over the radio interface 400 with each scheduled terminal device 600 in a particular TTI in the future.

S302: The REC 200a sometime in advance of the scheduled TTI informs the RE 300a, 300b about the radio interface allocation valid for this scheduled terminal device 600 by transmitting one message DL_DATA_TTI_CFG_REQ(SE, TTI, allocationinfo, modulation, weights) for each terminal device 600a. The message contains metadata (which describes the contents of the following data messages) and it includes at least information about TTI for when the data shall be transmitted, allocation information in terms of PRBs and layers, modulation to be used, beam forming weights to be applied for the different allocated segments. In case the metadata is too large to fit into one link layer packet, several messages may be sent as described above.

S303: The RE 300a, 300b, once the metadata has been received, prepares the resources to be used for the processing of the data messages.

S304: The REC 200a sends, for each symbol, DL data (IQ constellation points) to RE 300a, 300b symbol by symbol in messages DL_DATA_SYMB_REQ(SE_ID, SymbNo, NoOfSegments=m, segmentList[m], Data[ ]). As the size of the data may be large, this step may require several data signals for one symbol if it cannot fit into one link layer packet. Once the message(s) has been received, the RE 300a, 300b can start processing data for this symbol.

S305: The REC 200a sends the DL data (IQ constellation points) for the last symbol to the RE 300a, 300b in messages DL_DATA_SYMB_REQ(SE_ID, SymbNo, NoOfSegments=m, segmentList[m], Data[ ]). Once the message(s) has been received, the RE 300a, 300b can start processing data for this symbol.

Figure 11:
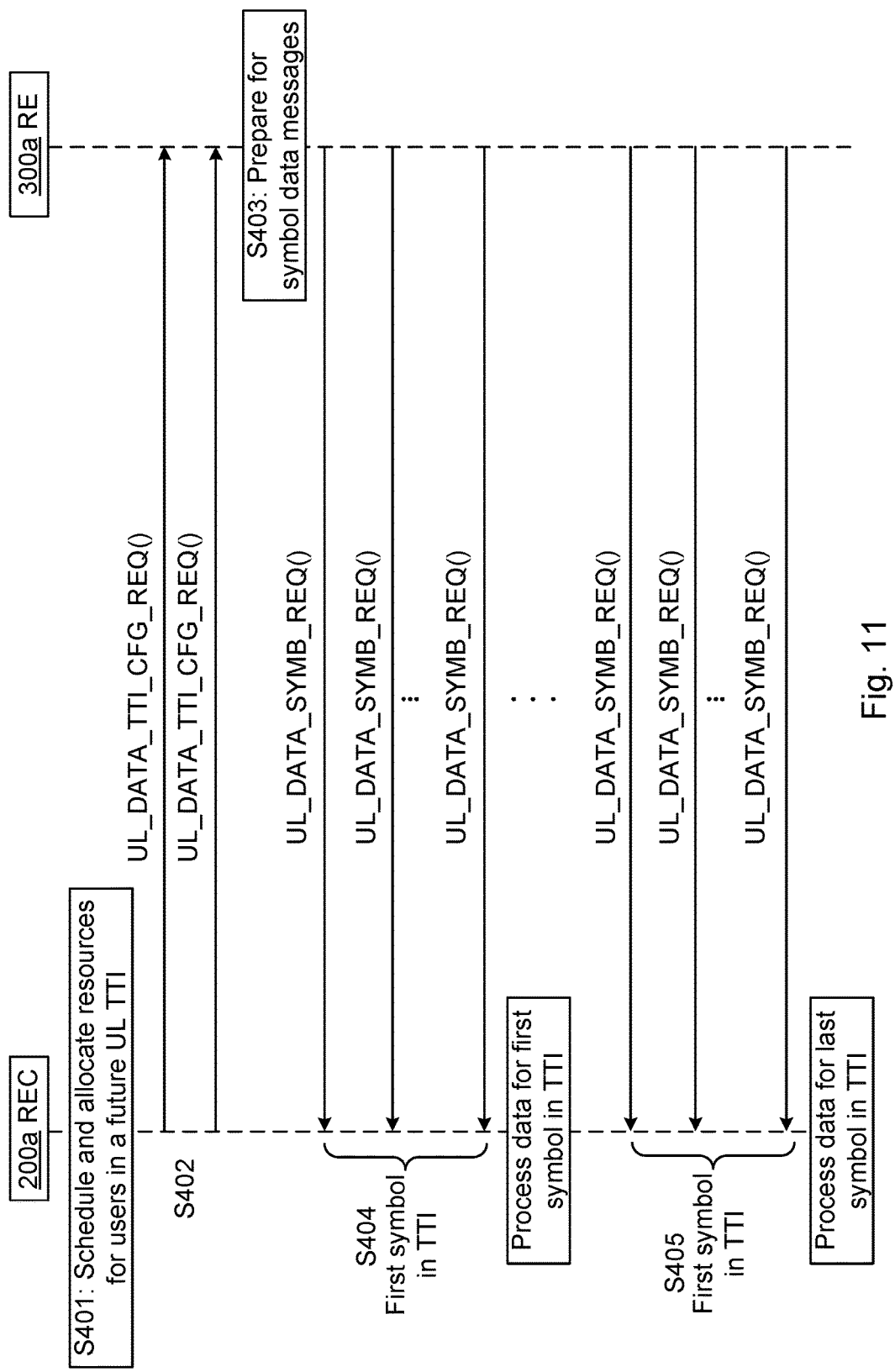
FIG. 11 is a signalling diagram for uplink data transfer over the REC-RE interface according to embodiments.

FIG. 11 is a signalling diagram for uplink data transfer over the REC-RE interface 700 for one TTI.

S401: The REC 200a schedules uplink reception, considering opportunities for multi-user MIMO with beamforming. That is, the REC 200a determines the radio interface resources to be used for each scheduled terminal device 600 for a particular TTI in the future.

S402: The REC 200a sometime in advance of the scheduled TTI informs the RE 300a, 300b about the radio interface allocation valid for this scheduled terminal device 600 by transmitting at least one message UL_DATA_TTI_CFG_REQ_( ). The message comprises metadata (which describes the contents of the following data messages) and it comprises at least information about TTI for when the data shall be received, allocation information in terms of BCS information including size of the BCS with respect to selected PRBs and for each BCS the beam weights that describe the applicable beams to be used during the reception. In case the metadata is too large to fit into one link layer packet, several messages may be sent as described above.

S403: The RE 300a, 300b, once the metadata has been received, prepares the resources to be used for the processing of the received data.

S404: The RE 300a, 300b sends, for each symbol, UL data to REC 200a, beam by beam for each symbol in messages UL_DATA_SYMB_REQ( ). As the size of the data may be large, this step may require several data signals for one symbol if it cannot fit into one link layer packet. Once the message(s) has been received, the REC 200a can start processing data for this symbol.

S405: The RE 300a, 300b sends the data for the last beam in the last symbol to the REC 200a in messages UL_DATA_SYMB_REQ( ). Once the message(s) has been received, the REC 200a can start processing data for this symbol.

According to an embodiment the allocation of radio resources pertain to an indication of an antenna pattern for the RE 300a, 300b to use when communicating common channel information on the radio interface 400.

Thus, in some aspects the RE 300a, 300b is preconfigured with a set of (sector shaped) antenna patterns and the REC 200a only transfers the index to the antenna pattern to use. Particularly, according to an embodiment the indication is defined by an index to the antenna pattern to use.

Further, in some aspects the RE 300a, 300b is preconfigured with a set of patterns that describe the allocation of common consecutive or interleaved signals and the REC 200a only transfers the index to the actual pattern. Hence, according to an embodiment the antenna pattern describe allocation of common consecutive or interleaved predefined signals.

In some aspects the REC 200a sends a dense description of the antenna pattern of common signals to the RE 300a, 300b. Hence, according to an embodiment the indication is defined by the antenna pattern itself.

Further aspects of the allocation pattern will now be disclosed.

In general terms, the common channels could be allocated to a consecutive set of sub-carriers in the frequency direction and this could be valid also for some of the common signals. There are also common signals which are interleaved with the data. Common signals could typically be Cell Specific RS as defined for LTE.

The REC 200a could be configured to configure the RE 300a, 300b for both common consecutive channels and signals as well as for common interleaved signals. There is a relation between a dedicated channel and which resource elements the common reference signal occupy within the PRBs a DL dedicated signal utilize. Both the allocation of the dedicated channels as well as the allocation of the common channels and reference signals need to be known in the RE 300a, 300b.

To keep down processing latency in a system that is connected with a packet based interface the content in each packet could be self-contained and thus allow the processing to start as soon as a packet arrive. From this perspective data for different terminal devices 600 as well as data for common channels and reference signals could be sent independently from the REC 200a to the RE 300a, 300b in the downlink.

At the same time there are typically dependencies with respect to where in the time/frequency grid the channels are allocated. To keep down the amount of allocation information to send from the REC 200a the RE 300a, 300b in the configuring of step S104, the allocation of common channels and reference signals, that is predictable and limited to a set of pre-defined allocations, could be provided to the RE 300a, 300b during preconfiguration, see above. Then during the time critical phase only indexes to the set of preconfigured antenna patterns could be transmitted from the REC 200a to the RE 300a, 300b over the REC-RE interface 700, see also above. Further, according to some aspect, for interleaved reference signals the antenna pattern could be sent with the starting sub-carrier, together with the distance to next allocation in number of sub-carriers and the ending sub-carrier.

When the beam pattern for the common channels is static or at least semi-static, the RE 300a, 300b could be provided with a set of beam shape patterns during preconfiguration. Then the REC 200a could configure the RE 300a, 300b using only an index to appoint which pattern that shall be used.

For the dedicated channels the beams are composed of a linear combination of beam directions. When beam directions for the dedicated channels static or at least semi-static the RE 300a, 300b could be configured by the REC 200a using the same principles as for the fixed beam direction. Thus the REC 200a could configure the RE 300a, 300b using only an index to appoint which beam directions that shall be used.

Figure 12:
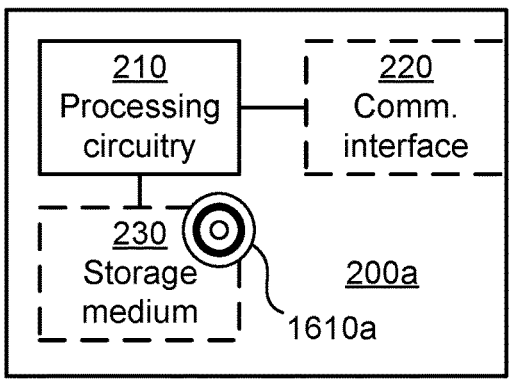
FIG. 12 is a schematic diagram showing functional units of an REC according to an embodiment.

FIG. 12 schematically illustrates, in terms of a number of functional units, the components of an REC 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the REC 200a to perform a set of operations, or steps, S102-S106, as disclosed above. For example, the storage medium 230 may store the set of operations, and the processing circuitry 210 may be configured to retrieve the set of operations from the storage medium 230 to cause the REC 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The REC 200a further comprises a communications interface 220 for communications with other entities of the access node 100, such as another REC 200b and one or more REs 300a, 300b. As such the communications interface 220 may comprise one or more transmitters and receivers, comprising analogue and digital components. The communications interface 220 is operatively connected to the REC-RE interface 700.

The processing circuitry 210 controls the general operation of the REC 200a e.g. by sending data and control signals to the communications interface 220 and the storage medium 230, by receiving data and reports from the communications interface 220, and by retrieving data and instructions from the storage medium 230. Other components, as well as the related functionality, of the REC 200a are omitted in order not to obscure the concepts presented herein.

Figure 13:
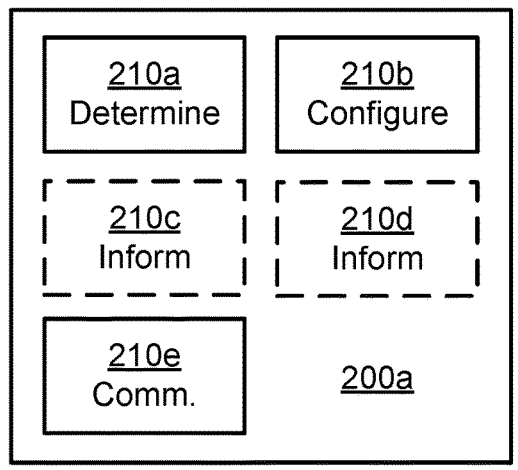
FIG. 13 is a schematic diagram showing functional modules of an REC according to an embodiment.

FIG. 13 schematically illustrates, in terms of a number of functional modules, the components of an REC 200a according to an embodiment. The REC 200a of FIG. 13 comprises a number of functional modules; a determine module 210a configured to perform step S102, a configure module 210b configured to perform step S104, and a communication module 210e configured to perform step S106. The REC 200a of FIG. 13 may further comprise a number of optional functional modules, such as any of an inform module 210c configured to perform step S104a and an inform module 210d configured to perform step S104b. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the REC 200a as disclosed herein.

Figure 14:
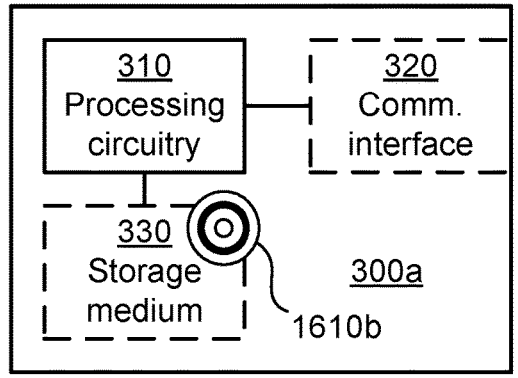
FIG. 14 is a schematic diagram showing functional units of an RE according to an embodiment.

FIG. 14 schematically illustrates, in terms of a number of functional units, the components of an RE 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the RE 300a, 300b to perform a set of operations, or steps, S202-S210, as disclosed above. For example, the storage medium 330 may store the set of operations, and the processing circuitry 310 may be configured to retrieve the set of operations from the storage medium 330 to cause the RE 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The RE 300a, 300b further comprises a communications interface 320 for communications other entities of the access node 100, such as one or more RECs 200a, 200b. As such the communications interface 320 may comprise one or more transmitters and receivers, comprising analogue and digital components. The communications interface 320 is operatively connected to the REC-RE interface 700.

The processing circuitry 310 controls the general operation of the RE 300a, 300b e.g. by sending data and control signals to the communications interface 320 and the storage medium 330, by receiving data and reports from the communications interface 320, and by retrieving data and instructions from the storage medium 330. Other components, as well as the related functionality, of the RE 300*a*, 300*b* are omitted in order not to obscure the concepts presented herein.

Figure 15:
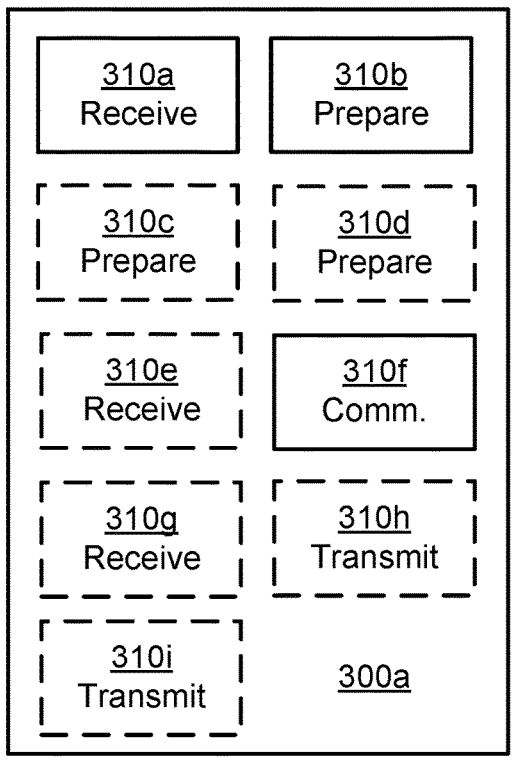
FIG. 15 is a schematic diagram showing functional modules of an RE according to an embodiment.

FIG. 15 schematically illustrates, in terms of a number of functional modules, the components of an RE 300*a*, 300*b* according to an embodiment. The RE 300*a*, 300*b* of FIG. 15 comprises a number of functional modules; a receive module 310*a* configured to perform step S202, a prepare module 310*b* configured to perform step S204, and a communication module 310*f* configured to perform step S208. The RE 300*a*, 300*b* of FIG. 15 may further comprise a number of optional functional modules, such as any of a prepare module 310*c* configured to perform step S204*a*, a prepare module 310*d* configured to perform step S204*b*, a radio receive module 310*e* configured to perform step S206, a receive module 310*g* configured to perform step S208*a* a transmit module 310*h* configured to perform step S208*b*, and a radio transmit module 310*i* configured to perform step S210. In general terms, each functional module 310*a*-310*i* may be implemented in hardware or in software. Preferably, one or more or all functional modules 310*a*-310*i* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*i* and to execute these instructions, thereby performing any steps of the RE 300*a*, 300*b* as disclosed herein.

The RE and REC may be provided as standalone devices or as a part of at least one further device. For example, as disclosed above the RE and REC may be provided in an access node. Alternatively, functionality of the RE and the REC may be distributed between at least two devices, or nodes.

Thus, a first portion of the instructions performed by the RE or REC may be executed in a first device, and a second portion of the of the instructions performed by the RE or REC may be executed in a second device; the herein disclosed embodiments are not limited to any particular number of devices on which the instructions performed by the RE or REC may be executed. Hence, the methods according to the herein disclosed embodiments are suitable to be performed by an RE or REC residing in a cloud computational environment. Therefore, although a single processing circuitry 210, 310 is illustrated in FIGS. 12 and 14 the processing circuitry 210, 310 may be distributed among a plurality of devices, or nodes. The same applies to the functional modules 210*a*-210*e*, 310*a*-310*i* of FIGS. 13 and 15 and the computer programs 1620*a*, 1620*b* of FIG. 16 (see below).

Figure 16:
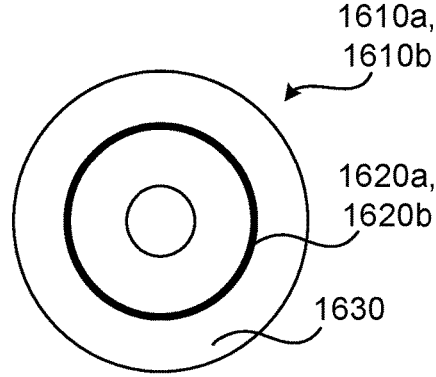
FIG. 16 shows one example of a computer program product comprising computer readable means according to an embodiment.

FIG. 16 shows one example of a computer program product 1610*a*, 1610*b* comprising computer readable means 1630. On this computer readable means 1630, a computer program 1620*a* can be stored, which computer program 1620*a* can cause the processing circuitry 210 and thereto operatively coupled entities and devices, such as the communications interface 220 and the storage medium 230, to execute methods according to embodiments described herein. The computer program 1620*a* and/or computer program product 1610*a* may thus provide means for performing any steps of the REC 200*a* as herein disclosed. On this computer readable means 1630, a computer program 1620*b* can be stored, which computer program 1620*b* can cause the processing circuitry 310 and thereto operatively coupled entities and devices, such as the communications interface 320 and the storage medium 330, to execute methods according to embodiments described herein. The computer program 1620*b* and/or computer program product 1610*b* may thus provide means for performing any steps of the RE 300*a*, 300*b* as herein disclosed.

In the example of FIG. 16, the computer program product 1610*a*, 1610*b* is illustrated as an optical disc, such as a CD (compact disc) or a DVD (digital versatile disc) or a Blu-Ray disc. The computer program product 1610*a*, 1610*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620*a*, 1620*b* is here schematically shown as a track on the depicted optical disk, the computer program 1620*a*, 1620*b* can be stored in any way which is suitable for the computer program product 1610*a*, 1610*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a radio equipment (RE) of an access node, the method being performed by a radio equipment controller (REC) of the access node, the REC having an REC-RE interface to the RE, the RE having a radio interface to a terminal device, the method comprising:

determining scheduling and allocation of radio resources, wherein the radio resources are to be used by the RE when communicating over the radio interface in a scheduled transmission time interval (TTI);

in advance of the scheduled TTI, sending configuration information over the REC-RE interface, thereby configuring the RE to operate according to the determined allocation of radio resources and to communicate with the REC according to the determined scheduling in the scheduled TTI; and communicating data with the RE in the scheduled TTI according to the determined scheduling, wherein the allocated radio resources configured in advance of the scheduled TTI are to be used for communicating the data over the radio interface in the scheduled TTI.

2. The method according to claim 1, wherein the configuring comprises:

informing the RE about in which scheduled TTI to operate according to the determined allocation of radio resources.

3. The method according to claim 1, wherein the configuring comprises:

informing the RE, when the data is part of uplink reception, to multiplex uplink measurements of terminal devices with uplink data of the terminal devices when communicating the data with the REC in the scheduled TTI.

4. A method for receiving configuration of a radio equipment (RE) of an access node, the method being performed by the RE, the RE having an REC-RE interface to a radio equipment controller (REC) of the access node, the method comprising:

receiving configuration information from the REC over the REC-RE interface in a preceding transmission time interval (TTI), in advance of a scheduled TTI, to operate according to an allocation of radio resources determined by the REC and to communicate with the REC according to a scheduling determined by the REC when communicating over a radio interface in the scheduled TTI;

preparing operation according to the determined allocation of radio resources; and communicating data with the REC in the scheduled TTI according to the determined scheduling, wherein the allocated radio resources configured in advance of the scheduled TTI are to be used for communicating the data over the radio interface in the scheduled TTI.

5. The method according to claim 4, wherein the configuration comprises information about which scheduled TTI to operate in according to the determined allocation of radio resources.

6. The method according to claim 4, wherein the configuration comprises information informing the RE to, when the data is part of uplink reception, multiplex uplink measurements of terminal devices with uplink data of the terminal devices when communicating the data with the REC in the scheduled TTI.

7. The method according to claim 4, wherein when the data is part of downlink transmission, the preparing comprises:

preparing, in advance of the scheduled TTI, the radio resources to be used for operating according to the determined allocation of radio resources.

8. The method according to claim 7, further comprising: transmitting the data on the radio interface in the scheduled TTI according to the prepared radio resources.

9. The method according to claim 4, wherein when the data is part of uplink reception, the preparing comprises:

preparing, in advance of the scheduled TTI, processing of the data for communicating the data to the REC according to the determined scheduling.

10. The method according to claim 9, further comprising: receiving the data on the radio interface in the scheduled TTI.

11. The method according to claim 10, wherein the communicating comprises:

transmitting on the REC-RE interface and in the scheduled TTI the data received on the radio interface to the REC after having been processed according to the prepared processing.

12. The method according to claim 4, wherein the data is part of downlink transmission or uplink reception.

13. The method according to claim 4, wherein the RE is configured to communicate with terminal devices, and wherein the allocation of radio resources, when the data is part of downlink transmission, is determined per terminal device.

14. The method according to claim 4, wherein the RE is configured to communicate in beams, the beams forming beam compose sections, and wherein the allocation of radio resources, when the data is part of uplink reception, is determined per beam compose section.

15. The method according to claim 4, wherein the RE is configured to communicate common channel information and with terminal devices, and wherein separate allocation of radio resources is determined for communicating the common channel information and for communicating with the terminal devices.

16. The method according to claim 4, wherein the configuration is provided to the RE as configuring information in messages, and wherein at least one of the messages comprises configuring information of at least two beams and/or terminal devices.

17. The method according to claim 4, wherein the configuration is provided to the RE as configuring information, and wherein the configuring information per beam and/or terminal device is spread between at least two messages.

18. The method according to claim 16, wherein the messages are transmitted as payload in Ethernet packets, wherein the payload in each Ethernet packet comprises a header field defined by the REC-RE interface and a payload field comprising the configuring information.

19. The method according to claim 4, wherein the allocation of radio resources relates to an indication of an antenna pattern for the RE to use when communicating common channel information on the radio interface.

20. A radio equipment controller (REC) of an access node for configuring a radio equipment (RE) of the access node, the REC having an REC-RE interface to the RE and comprising:

processing circuitry; and a storage medium storing instructions that, when executed by the processing circuitry, cause the REC to:

determine scheduling and allocation of radio resources, wherein the radio resources are to be used by the RE when communicating over a radio interface in a scheduled transmission time interval (TTI);

in advance of the scheduled TTI, sending configuration information to the RE to configure the RE to, in the scheduled TTI, operate according to the determined allocation of radio resources and communicate with the REC according to the determined scheduling; and communicate data with the RE in the scheduled TTI according to the determined scheduling.

* * * * *